(12) United States Patent
Ceballos

(10) Patent No.: US 8,059,114 B2
(45) Date of Patent: Nov. 15, 2011

(54) ORGANIC LIGHT EMITTING DIODE DRIVER

(75) Inventor: Jose Luis Ceballos, Villach (AT)

(73) Assignee: Infineon Technologies AG, Neubiberg (DE)

( * ) Notice: Subject to any disclaimer, the term of this patent is extended or adjusted under 35 U.S.C. 154(b) by 1035 days.

(21) Appl. No.: 11/940,004

(22) Filed: Nov. 14, 2007

(65) Prior Publication Data

US 2009/0121642 A1    May 14, 2009

(51) Int. Cl.
*G06F 3/038* (2006.01)
*G09G 3/32* (2006.01)

(52) U.S. Cl. ............ 345/212; 345/82; 345/83; 345/204; 345/211; 345/214

(58) Field of Classification Search ............ 345/76, 345/80, 82, 83, 204, 211, 212, 214
See application file for complete search history.

(56) References Cited

U.S. PATENT DOCUMENTS

| | | | | |
|---|---|---|---|---|
| 5,811,999 A * | 9/1998 | Hall et al. | | 327/156 |
| 6,307,361 B1 * | 10/2001 | Yaakov et al. | | 323/288 |
| 6,809,710 B2 * | 10/2004 | Prache et al. | | 345/82 |
| 6,952,131 B2 * | 10/2005 | Jeong et al. | | 330/10 |

* cited by examiner

Primary Examiner — My-Chau T Tran
(74) Attorney, Agent, or Firm — Lee & Hayes, PLLC

(57) ABSTRACT

Pulse width modulation (PWM) of a drive current to an organic light emitting diode (OLED) is performed by a circuit subjected to corresponding signaling.

17 Claims, 5 Drawing Sheets

ORGANIC LIGHT EMITTING DIODE DRIVER

BACKGROUND

It is often necessary or desirable to selectively control the output or operating rate of numerous kinds of electronic loads. Typically, the voltage and/or current applied to the load is/are varied in order to achieve the control effect. One type of load that can be controlled is an organic light emitting diode (OLED). By selectively varying the average applied electrical current, the luminance (i.e., brightness) of an OLED can be suitably modulated.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Disclosed herein are controllable drive circuits for powering an organic light emitting diode (OLED) or other electronic load. According to one implementation, a circuit structure is provided that applies a pulse width modulated (PWM) drive current to an OLED. The time-average drive current to the OLED can be modulated in accordance with a periodically sampled control signal. In turn, the luminance of the OLED can be suitably varied over a control range. Circuit structures provided herein can be fabricated at least in part on a common substrate such that respective integrated circuit devices are defined. In one or more implementations, at least a portion of drive circuits presented herein can be fabricated within a 65 nanometer (or smaller) environment.

According to one aspect, a control signal is periodically sampled and used to control the average current drive to an OLED. A periodic ramp signal synchronizes a current pulse to the OLED. A storage device is discharged during a first period of operation, and then charged by way of an OLED drive current during a second phase of operation. Periodic ramp and sampling signals can be provided from respective sources external to a drive circuit of the present teachings. An integrated circuit can be provided, including a periodic ramp signal source and a sampling signal source and a drive circuit of the present teachings.

The techniques described herein may be implemented in a number of ways. One illustrative context is provided below with reference to the included figures and ongoing discussion.

Exemplary Circuits

Figure 1:
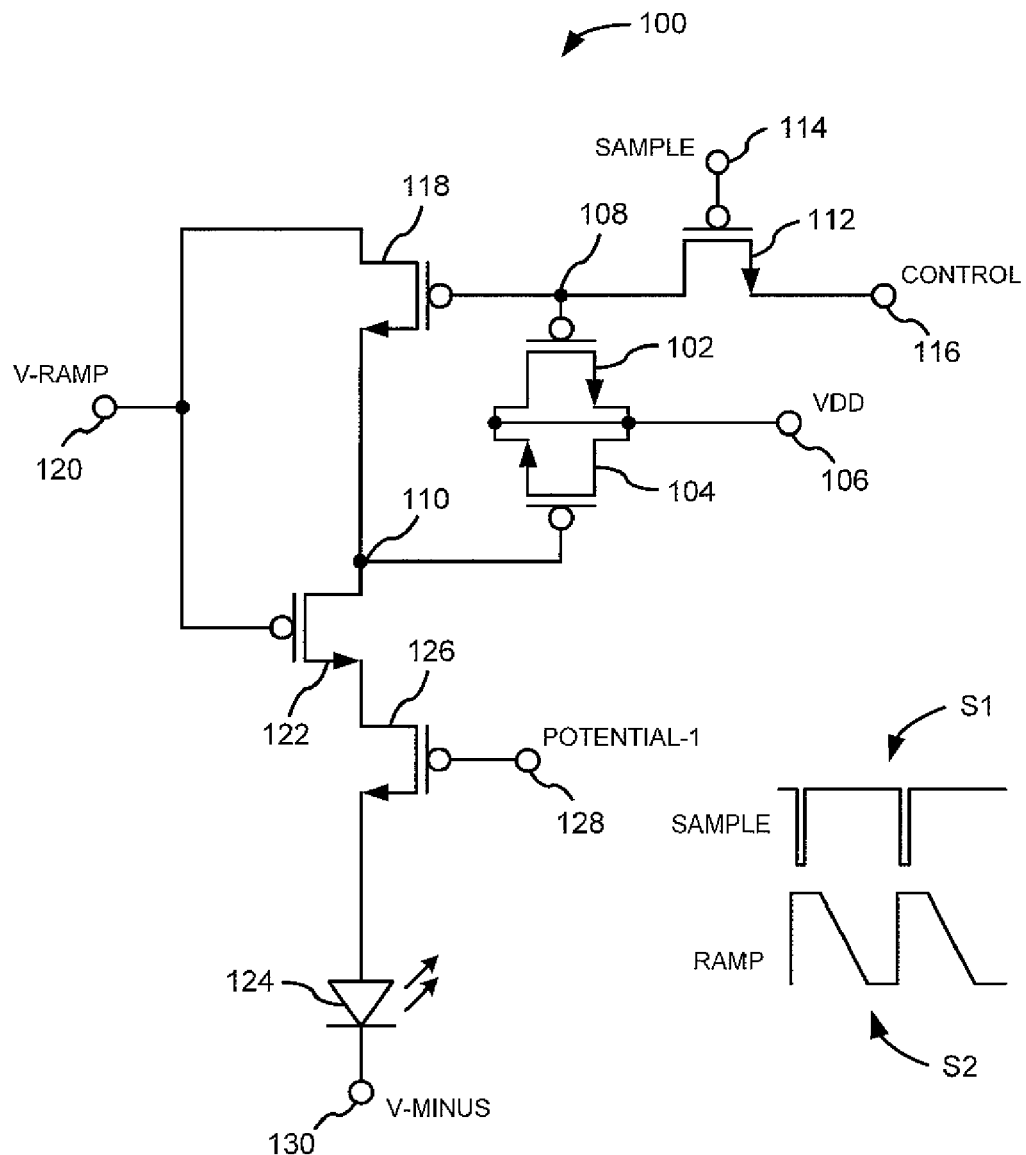
FIG. 1 is a schematic circuit diagram of a drive circuit in accordance with the present teachings.

FIG. 1 shows an illustrative circuit 100 in accordance with the present teachings. The circuit 100 can also be referred to as a drive circuit 100. The circuit 100 includes a pair of respective charge storage devices 102 and 104. As depicted, each of the charge storage devices (storage devices) 102 and 104 is defined by a metal-oxide semiconductor capacitor (MOSCAP). In particular, each of the storage devices 102 and 104 is depicted by a P-channel metal-oxide semiconductor (PMOS) transistor. Other charge storage devices 102 and 104 (e.g., capacitors, etc.) can also be used. In any case, the storage device 102 has a first charge storage plate (or region) configured to be connected to a source of voltage (VDD) at a node 106. The storage device 102 also has a second plate (or region) connected to a circuit node 108. The storage device 104 has a first plate (or region) configured to be connected to VDD at node 106 and a respective second plate (or region) connected to a circuit node 110.

The circuit 100 also includes a transistor 112. As depicted, the transistor 112 is defined by a P-channel metal-oxide semiconductor (PMOS) field effect transistor. Other suitable types of transistor 112 can also be used. The transistor 112 includes a control node (e.g., gate) that is configured to be connected to a source of a periodic sampling signal at a node 114. The transistor 112 is further configured to electrically couple the charge storage device 102 (i.e., node 108) with a source of a control signal at a node 116. An illustrative, non-limiting example of a periodic sampling signal S1 is depicted in FIG. 1.

As used herein, the term "electrically couple" (and it various derivatives and tenses) refers to realizing an electrical pathway, or portion of such a pathway, between two or more entities. In the case of a transistor, the degree of electrical coupling is established, at least in part, in accordance with signaling applied to a control node (e.g., gate) of that transistor. For example, a periodic sampling signal at node 114 exerts a controlling influence on the transistor 112 such that an electrical pathway (or isolation) between the nodes 108 and 116 is realized accordingly. One of ordinary skill in the electrical engineering arts appreciates the controllable electrical coupling behavior of various types of transistors and further elaboration on this basic point is not required for an understanding of the present teachings.

The circuit 100 also includes a transistor 118. As depicted, the transistor 118 is a PMOS transistor. Other suitable types of transistor 118 can also be used. The transistor 118 includes a control node (e.g., gate) connected to the charge storage device 102 by way of node 108. The transistor 118 is configured to electrically couple the storage device 104 (i.e., node 110) to a source of a periodic ramp signal at a circuit node 120. Thus, electrical coupling between nodes 110 and 120 by way of the transistor 118 is determined at least in part by an electrical charge, if any, held by the storage device 102. An illustrative, non-limiting example of a periodic ramp signal S2 is also depicted in FIG. 1.

The circuit 100 includes a transistor 122. As depicted, the transistor 122 is a PMOS transistor. Other suitable types of transistor 122 can also be used. The transistor 122 includes a control node (e.g., gate) configured to be connected to the periodic ramp signal by way of node 120. The transistor 122 is configured to electrically couple the storage device 104 to an organic light emitting diode (OLED) 124. The electrical coupling between the storage device 104 and the OLED 124 by way of transistor 122 is determined at least in part by the periodic ramp signal present at node 120.

The circuit 100 further includes a transistor 126. As depicted, the transistor 126 is a PMOS transistor. Other suitable types of transistor 126 can also be used. The transistor 126 includes a control node (e.g., gate) configured to be connected to a source of potential (POTENTIAL-1) at a node 128. POTENTIAL-1 can be ground potential, or another suitable potential less than (i.e., negative with respect to) VDD. The transistor 126 is configured to electrically couple the transistor 122 to the OLED 124. The transistor 126 is further configured to absorb, or buffer, a voltage drop during periods of operation of the circuit 100 when (essentially) no electrical current is being provided to the OLED 124. In this way, the transistor 126 serves to prevent over-voltage damage to the transistor 122 during certain phases of operation of the circuit 100. Further elaboration on this and other aspects of the operation of circuit 100 is provided below. The circuit 100 includes an OLED 124 as introduced above. The OLED 124 can be referred to as a load, or portion of an overall load, within the context of the present teachings. The OLED 124 is configured to be connected to a voltage source V-MINUS at a circuit node 130.

In one or more other implementations (not shown), the transistor 126 is not present and another device is included to protect OLED 124. In one or more such implementations, the protective device (not shown) performs a clamping function so as to limit the voltage across the OLED 124 to a safe level. Non-limiting examples of clamping devices (not shown) include a diode, a MOSFET transistor in diode-connected configuration, etc.

The circuit 100 of FIG. 1 is configured as a whole to provide a selectively adjustable PWM drive current to the OLED 124 or another suitable load. The circuit 100 operates in accordance with a periodic sampling signal (e.g., S1), a variable control signal, and a periodic ramp signal (e.g., S2), as well as direct current (DC) voltage sources VDD, POTENTIAL-1 and V-MINUS. Table 1 below includes illustrative, non-limiting examples of selected voltages and component values in accordance with one implementation of the circuit 100.

TABLE 1

ILLUSTRATIVE VALUES

| | |
|---|---|
| VDD | 2.5 Volts |
| V-CONTROL | 0.6 to 2.0 Volts |
| V-MINUS | −4.0 Volts |
| STORAGE (102) | $1.0 \times 10^{-15}$ Farads |
| STORAGE (104) | $10.0 \times 10^{-15}$ Farads |
| POTENTIAL-1 | 0.0 Volts (ground) |

Figure 2:
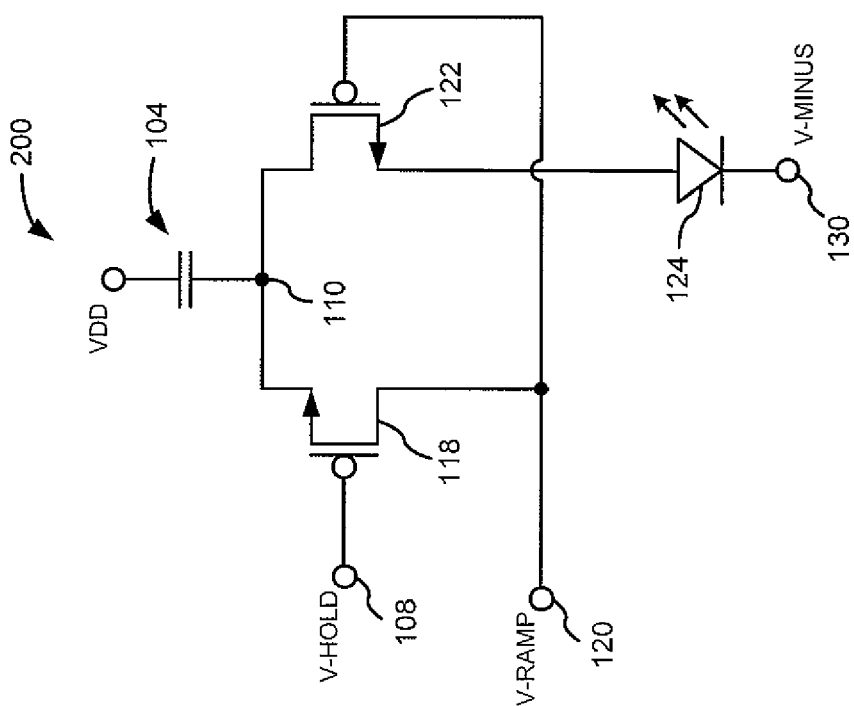
FIG. 2 is a simplified representation of certain functional aspects of the drive circuit of FIG. 1.

FIG. 2 shows a circuit 200 that illustrates selected functional portions of the circuit 100. The circuit 200 omits elements of the circuit 100 in the interest of clarity of understanding. The circuit 200 includes primarily those elements that cooperate to provide a pulse width modulated drive current to the OLED 124. The circuit 200 will be referred to hereinafter during description of the operation of the circuit 100.

Exemplary Operations

Figure 3:
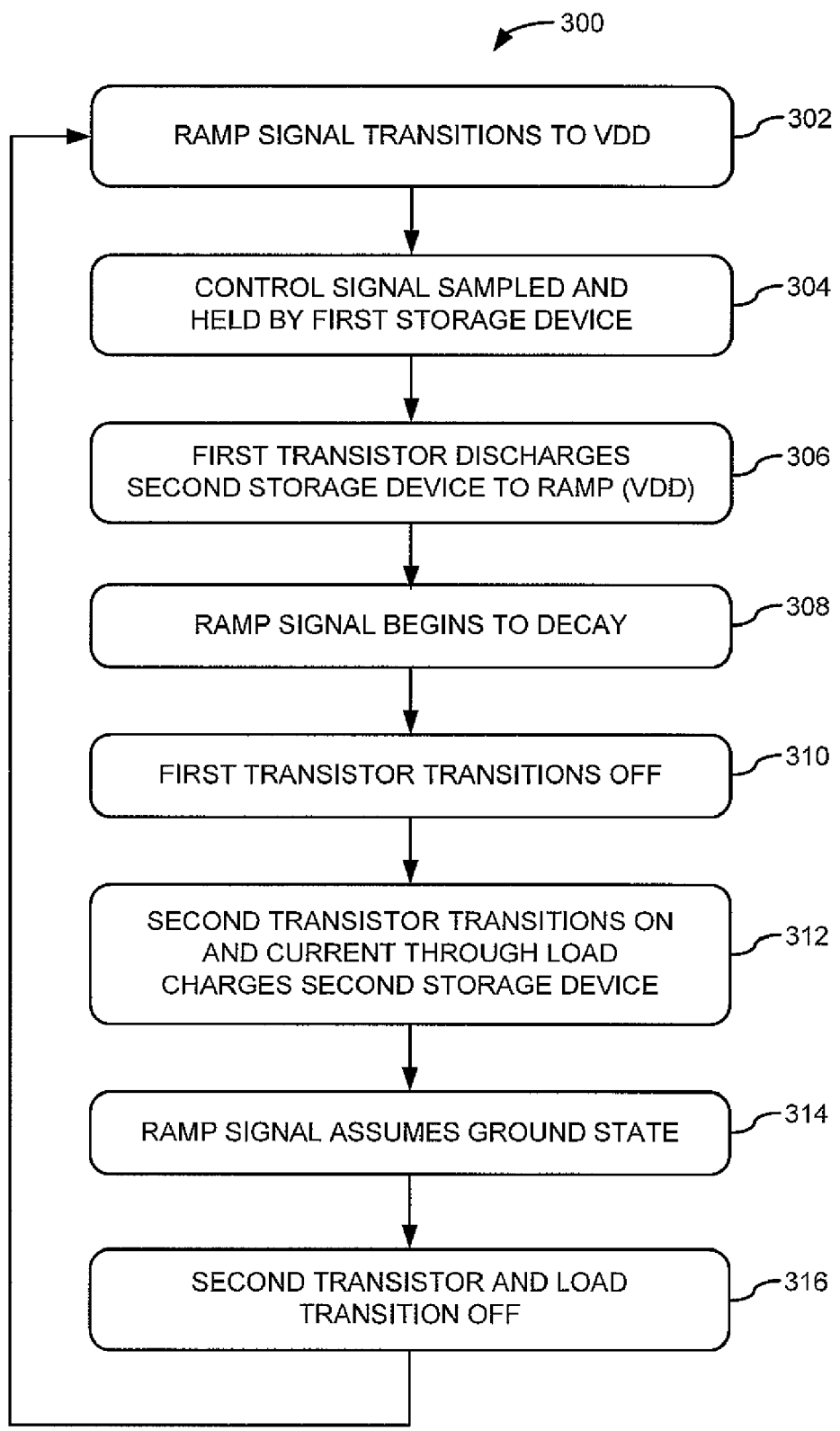
FIG. 3 flow diagram depicting an operational period of the drive circuit of FIG. 1.

FIG. 3 is a flow diagram depicting an illustrative operational sequence 300 of a circuit, such as the circuit 100. The sequence 300 includes particular operational steps and a particular order of execution. However, certain operational steps can be omitted or other steps added, and/or other orders of execution can also be performed, without departing from the scope of the present teachings. The sequence 300 depicts a repetitive flow of distinct and discrete events in the interest of clarity of understanding. However, one of skill in the electrical arts can appreciate that the circuit 100 operates in an essentially continuous manner, transitioning from one operational phase to the next.

At 302, a periodic ramp signal transitions to an electrical potential of VDD. Typically, but not necessarily, this transition is a step change from a previous ground state (e.g., zero volts). In one non-limiting example, VDD is equal to 2.5 volts DC. Other suitable levels of VDD can also be used. The ramp signal holds this VDD value constant for a period of time. With reference to the circuit 100, the ramp signal is assumed present at node 120 and is represented by the label V-RAMP in FIGS. 1, 2 and 4.

At 304, a periodic sampling signal causes a control signal to be sampled and held by way of a first storage device. In circuit 100, the sampling signal is present at node 114 and causes the transistor 112 to electrically couple the control signal at node 116 to the storage device 102. In response, the storage device 102 stores (i.e., holds) a charge corresponding to the instantaneous (or nearly so) value of the control signal. This sampled value is represented as V-HOLD in the circuit 200 of FIG. 2.

At 306, a first transistor is used to discharge a second storage device to ramp signal potential, presently VDD. In circuit 100, the transistor 118 is biased by V-HOLD to electrically couple V-RAMP at node 120 to the storage device 104 at node 110. Presently, V-RAMP is at a constant value of VDD and the storage device 104 effectively "discharges" such that VDD potential is present at both plates (regions).

At 308, the ramp signal begins to decay. In circuit 100, V-RAMP at node 120 begins to decay toward ground state potential. The rate at which the ramp signal decays is referred to as the "slew rate" of the ramp signal. As depicted by signal S2 in FIG. 1, this decay is linear in nature. However, other suitable decay patterns (logarithmic, etc.) can also be used.

At 310, V-RAMP decays to a point such that, in accordance with the value of V-HOLD, the first transistor begins to shut off. In circuit 100, the transistor 118 shuts down and no longer provides appreciable electrical coupling between V-RAMP at node 120 and the storage device 104. Thus, node 120 and the storage device 104 (i.e., node 110) are effectively electrically isolated from each other. In one non-limiting implementation, "shut off" occurs when V-RAMP is approximately equal to (V-HOLD+VT1), wherein VT1 is the (gate-to-source) threshold voltage of the transistor 118.

At 312, the ramp signal continues to further decay until a second transistor begins to turn on. This second transistor serves to electrically couple a load with the second storage device resulting in the flow of an electrical current through the load. In the circuit 100, the transistor 122 is biased by virtue of V-RAMP at node 120 to conduct current between the storage device 104 and the organic light emitting diode 124. Also, the transistor 126, which serves to protect transistor 122, operates as another link in the electrical coupling of the storage device 104 to the OLED 124. In any case, the transistor 122 is now operating essentially as a source follower, wherein the current through the OLED 124 is approximated by the expression:

$$I_{OLED} = (SR)(C_{104}) \quad \text{(Expression 1)}$$

wherein $I_{OLED}$ is the instantaneous current through the OLED 124 in Amperes, SR is the slew rate of the ramp signal in Volts/Second, and $C_{104}$ is the value of the capacitor 104 in Farads. Expression 1 is a specific form of the well known relationship: i=(C)(dv/dt). Current flow through the OLED 124 serves to charge the storage device 104 and drive the potential at node 110 down toward V-MINUS value (e.g., −4 volts, etc.).

At 314, the ramp signal assumes a constant ground state for a period of time. In circuit 100, V-RAMP at node 120 goes to ground potential and holds steady for a period of time.

At 316, the constant charging of the second storage device reaches a point where the second transistor transitions off. Thus, the pulse of electrical current through the load, which began at 312 above, is ended. Transistor 122 transitions off, and the flow of electrical current through the OLED 124 and transistor 126 is terminated. Thus, one complete operating period of the circuit 100 has transpired and the sequence 300 returns to 302 above.

The sequence 300 depicts a single operating period within the cyclic, ongoing operation of the circuit 100. The magnitude and maximum duration of the electrical current pulse through the OLED 124 is substantially determined by characteristics of the periodic ramp signal such as, for example, peak-to-peak magnitude, frequency, slew rate of the decay portion of the waveform, and so. In turn, the width of the current pulse delivered to the OLED 124 can be modulated over a range by way of the sampled control signal. Thus, operational boundaries of the circuit 100 can be established, to a significant extent, by the characteristics of the periodic ramp signal. Pulse width modulation within those boundaries can then be accomplished by way of a single variable, the control signal.

The circuit 100 is directed to controlling the luminance of the OLED 124. In one implementation, the OLED 124 can be a thought of as a stand-alone device. However, in other implementations, the OLED 124 is but one of a vast array of organic light emitting diodes that define respective pixels within an electronic display. In such an implementation, each OLED is selectively driven by a respective circuit 100 such that images can be presented on the overall display. The circuit 100, in one or more suitably scaled implementations, can also be applied to control various other loads (e.g., electric motors, other types of light emitting diodes, incandescent lamps, audible transducers, etc.).

Exemplary Signaling

Figure 4:
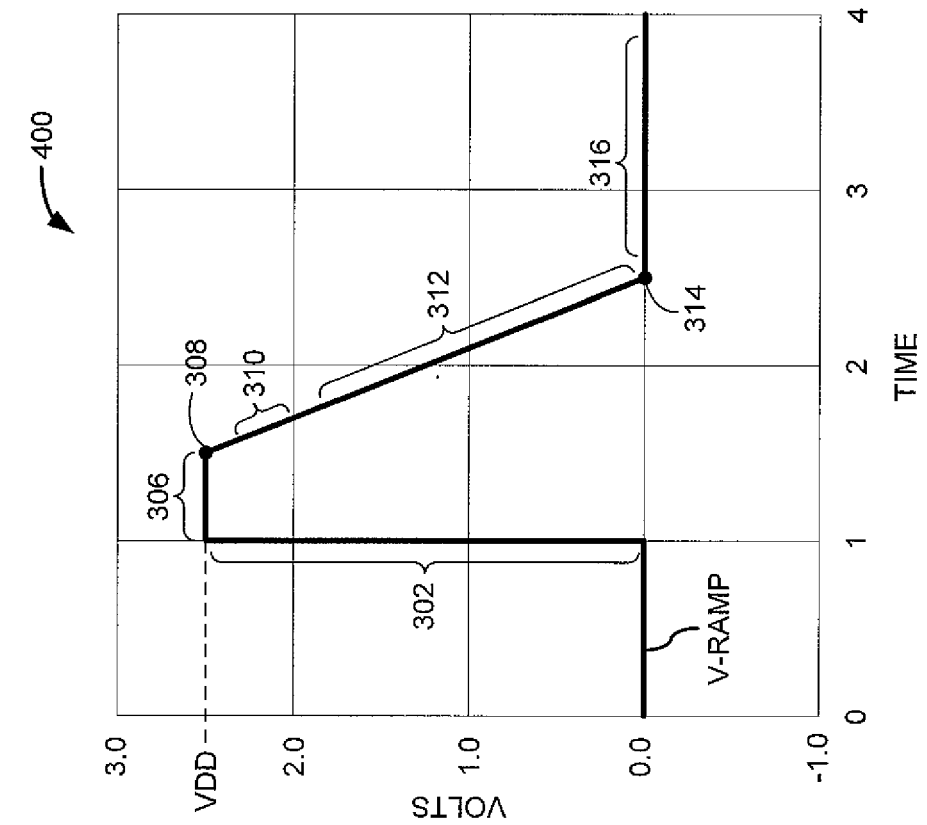
FIG. 4 is a signal timing diagram depicting a ramp signal in accordance with the present teachings.

FIG. 4 is a signal timing diagram 400 depicting a one cycle of an illustrative and non-limiting periodic ramp signal (i.e., V-RAMP). FIG. 4 includes labeling 302 and 306-316 in correspondence to the steps of the sequence 300 described above. The timing diagram 400 is included so that operation of the circuit 100 can be better appreciated.

Figure 5:
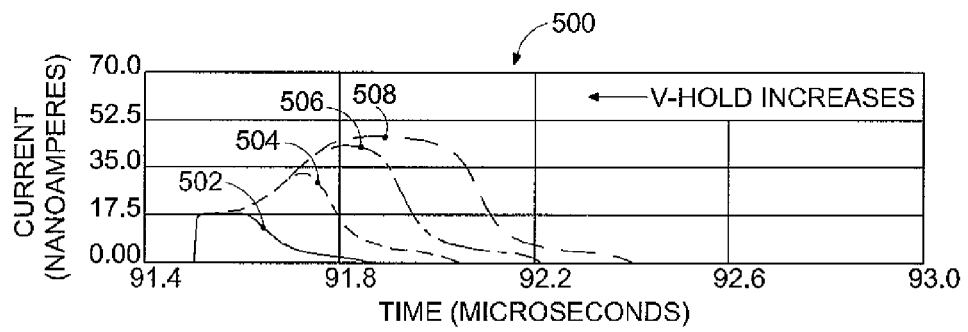
FIG. 5 is a signal timing diagram depicting current flow within a portion of the drive circuit of FIG. 1.

FIG. 5 is a signal timing diagram 500 depicting current flow within a portion of the circuit 100. The diagram 500 includes four distinct, illustrative operating curves (or loci) 502-508 respectively corresponding to electrical current flow from the ramp signal at node 120, through transistor 118, and to the storage device 104 by way of node 110. Thus, diagram 500 depicts respective discharge curves for the storage device 104. Each of the loci 502-508 corresponds to a respective sampled control signal value (V-HOLD) as stored at node 108. As such, loci 502 corresponds to a greatest V-HOLD value (e.g., 2.0 volts), while the loci 508 corresponds to a least V-HOLD value (e.g., 0.6 volts), over an illustrative control signal range. In turn, loci 504 and 506 correspond to respective intermediate V-HOLD values. FIG. 5 shows that for respectively increasing V-HOLD values, the total electrical charge (i.e., time integral of current) through the transistor 118 decreases.

Figure 6:
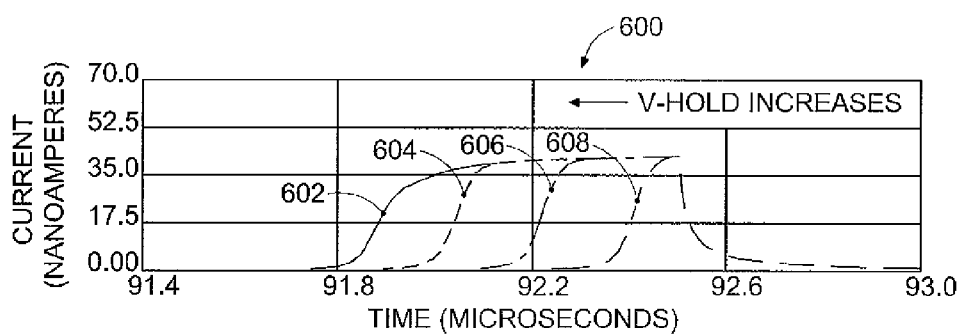
FIG. 6 is a signal timing diagram depicting current flow within another portion of the drive circuit of FIG. 1.

FIG. 6 is a signal timing diagram 600 depicting current flow within another portion of the circuit 100. The diagram 600 includes four distinct, illustrative operating loci 602-608 respectively corresponding to electrical current flow from the storage device 104, through the respective transistors 122 and 126, and to the OLED 124. Therefore, diagram 600 depicts respective (PWM) current pulses through the OLED 124 (i.e., load). Each of the loci 602-608 corresponds to a respective V-HOLD value. Loci 602, 604, 606 and 608 correspond to respective greatest-to-least V-HOLD values, respectively, over an illustrative control signal range. FIG. 6 shows that for respectively increasing V-HOLD values, the total electrical charge through the OLED 124 increases.

Figure 7:
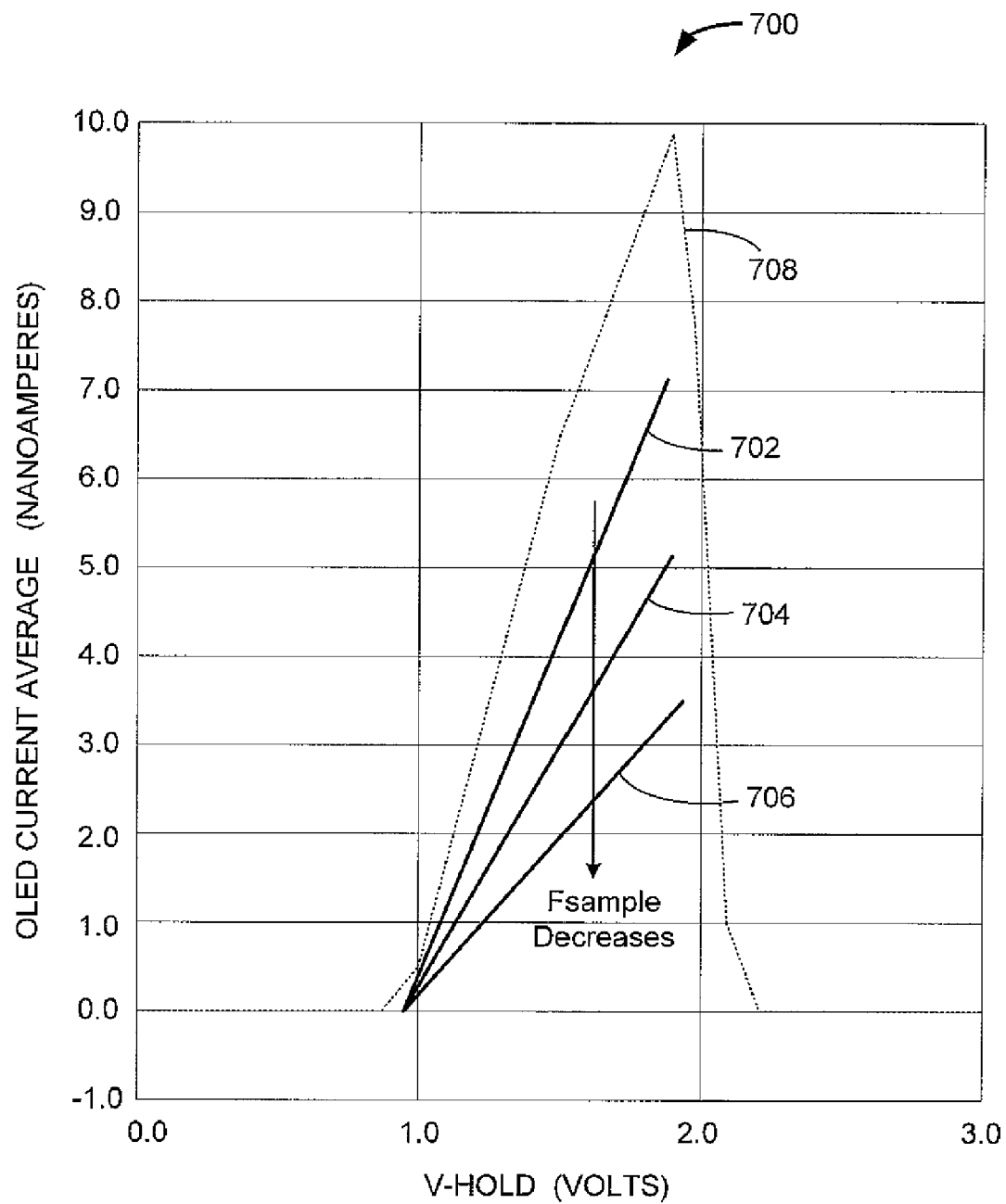
FIG. 7 is a signal diagram depicting current-to-voltage relationships in accordance with the present teachings.

FIG. 7 is a signal diagram 700 depicting illustrative control voltage-to-load current relationships in accordance with illustrative operations of the circuit 100. With reference to circuit 100, the diagram 700 plots control voltage V-HOLD (node 108) versus the average current through the OLED 124. The diagram 700 includes three illustrative performance curves (or loci) 702, 704 and 706, respectively. Each locus 702-706 represents a control voltage-to-average load current relationship at a respective periodic sampling frequency (e.g., SAMPLE, at node 114). Thus, locus 702 represents a sampling frequency that is higher than that of either of the two loci 704 and 706. In turn, the locus 706 represents a sampling frequency that is lower than that of either of the other loci 702 and 704.

As depicted by FIG. 7, a decrease in sampling frequency results in a corresponding decrease in the maximum average current that can be delivered to the OLED 124. In other words, a decrease in sampling frequency results in a narrower available control range, having a lower maximum operating point. Thus, if an overall control range with a relatively greater maximum OLED luminance is desired, then a relatively higher sampling frequency must be used. In one non-limiting implementation, the periodic sampling signal at node 114 has a frequency of three-hundred kilohertz. Other appropriate sampling frequencies can also be used.

Diagram 700 also depicts an outer performance envelope 708. The area bounded by the envelope 708, including loci 702-706, represents all possible control voltage-to-load current operating points for an illustrative implementation of the circuit 100. Other drive circuits in accordance with the present teachings can have correspondingly varying performance envelopes. Diagram 700 also shows that a minimum control voltage must be used in order to obtain a minimum conduction angle. As depicted, this minimum control voltage is slightly less than one volt DC. This value corresponds to the threshold voltage of the transistor 118 of circuit 100.

In consideration of the circuit 100, diagram 700 indicates that the average load current can be approximated by expression:

$$I_{OLED(Avg)} = (SR)(C_{104})(\Delta T/T) \qquad \text{(Expression 2)}$$

wherein $I_{OLED(Avg)}$ is the average current through the OLED 124 in Amperes, SR is the slew rate of the V-RAMP (at node 120) in Volts/Second, $C_{104}$ is the value of the capacitor 104 in Farads, $\Delta T$ is the conduction time, and T is the period of the sampling signal (at node 114).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims.

The invention claimed is:

1. An electronic circuit, comprising:
   a first charge storage device and a second charge storage device;

a first transistor having a control node connected to the first charge storage device, the first transistor configured to electrically couple a ramp signal source to the second charge storage device; and a second transistor having a control node configured to be connected to the ramp signal source, the second transistor further configured to electrically couple a load to the second charge storage device.

2. The electronic circuit according to claim 1, wherein the load includes an organic light emitting diode (OLED).

3. The electronic circuit according to claim 1, further comprising a third transistor having a control node configured to be connected to a sampling signal source, the third transistor configured to electrically couple a control signal source to the first charge storage device.

4. The electronic circuit according to claim 1, further comprising a third transistor configured to electrically couple the second transistor to the load.

5. The electronic circuit according to claim 1, wherein at least one of the first charge storage device or the second charge storage device is defined by a respective metal-oxide semiconductor (MOS) device.

6. The electronic circuit according to claim 1, wherein at least a portion of the electronic circuit is fabricated within a 65 nanometer environment.

7. An electronic driver circuit, comprising:
a first storage device configured to be connected to a voltage source, the first storage device further configured to store a charge corresponding to a control signal;
a second storage device configured to be connected to the voltage source;
a first transistor having a control node connected to the first storage device, the first transistor configured to electrically couple the second storage device to a source of a periodic ramp signal; and
a second transistor having a control node configured to be connected to the source of the periodic ramp signal, the second transistor further configured to electrically couple a load to the second storage device.

8. The electronic driver circuit according to claim 7, further comprising:
a third transistor having a control node configured to be connected to a periodic sampling signal source, the third transistor further configured to electrically couple the control signal source to the first charge storage device; and
a fourth transistor configured to electrically couple the second transistor to the load, the fourth transistor further configured to absorb a voltage drop when no electrical current is flowing to the load.

9. The electronic driver circuit according to claim 7, wherein the load includes an organic light emitting diode (OLED).

10. The electronic driver circuit according to claim 7, wherein at least one of the first storage device or the second storage device is defined by a metal-oxide semiconductor (MOS) device.

11. The electronic driver circuit according to claim 7, wherein at least one of the first transistor or the second transistor is defined by a metal-oxide semiconductor field effect transistor (MOSFET).

12. The electronic driver circuit according to claim 7, wherein the first transistor is further configured to return the electronic driver circuit to a reset condition in accordance with the periodic ramp signal.

13. The electronic driver circuit according to claim 7, wherein at least a portion of the electronic driver circuit is fabricated within a 65 nanometer environment.

14. An electronic driver circuit, comprising:
a first charge storage device and a second charge storage device fabricated on a common substrate; and
a first transistor, a second transistor, and a third transistor fabricated on the common substrate, wherein:
the first transistor includes a control node connected to the first charge storage device, the first transistor configured to electrically couple a source of a periodic ramp signal to the second charge storage device;
the second transistor includes a control node configured to be connected to the source of the periodic ramp signal, the second transistor configured electrically couple a load to the second charge storage device; and
the third transistor including a control node configured to be connected to a source of a periodic sampling signal, the third transistor configured to electrically couple a source of a control signal to the first charge storage device.

15. The electronic driver circuit of claim 14, wherein the first transistor and the second transistor and the second charge storage device are cooperatively configured to provide a pulse width modulated (PWM) drive current to the load in accordance with the periodic ramp signal and the control signal.

16. The electronic driver circuit of claim 14, wherein the third transistor and the first charge storage device are cooperatively configured to sample-and-hold the control signal in accordance with the periodic sampling signal.

17. The electronic driver circuit of claim 14, wherein the load includes an organic light emitting diode (OLED).

* * * * *